United States Patent [19]
Bennett et al.

[11] Patent Number: 5,760,563
[45] Date of Patent: Jun. 2, 1998

[54] METHOD AND APPARATUS FOR PROVIDING THERMAL FEEDBACK BETWEEN AN ANALOG POWER CHIP AND A DIGITAL CONTROLLER CHIP IN A DISK CONTROLLER SYSTEM

[75] Inventors: George J. Bennett, Murrietta; Donald G. Stupeck, Laguna Hills, both of Calif.

[73] Assignee: Western Digital Corporation, Irvine, Calif.

[21] Appl. No.: 671,904

[22] Filed: Jun. 28, 1996

[51] Int. Cl.$^6$ .................................................. G05D 23/00
[52] U.S. Cl. .................. 318/641; 318/471; 318/599; 318/811; 388/811; 361/25; 361/103
[58] Field of Search ...................... 318/561, 471, 318/480, 599, 257, 601, 606, 641; 361/106, 101, 94, 24, 25, 103; 364/483, 489, 557; 388/811, 819; 363/41, 74, 75, 78

[56] References Cited

U.S. PATENT DOCUMENTS

| | | | |
|---|---|---|---|
| 4,599,548 | 7/1986 | Schultz ............................. | 318/599 |
| 5,084,791 | 1/1992 | Thanos et al. .................... | 364/557 |
| 5,128,813 | 7/1992 | Lee .................................. | 360/78.07 |
| 5,379,230 | 1/1995 | Morikawa et al. ............... | 361/106 |
| 5,557,550 | 9/1996 | Vigil et al. ....................... | 360/77.04 |

*Primary Examiner*—John W. Cabeca
*Attorney, Agent, or Firm*—Leo J. Young; Milad G. Shara

[57] ABSTRACT

A disk drive has a microprocessor, a digital controller chip, and an analog power chip, and a multi-winding spindle motor. The power chip operates under gross and fine control to connect and disconnect, during ON and OFF phases, a supply voltage to each winding on a PWM basis. The magnitude of the supply voltage and the temperature of the power chip vary. The microprocessor sends a digital control signal to the controller chip for gross control. The controller chip sends a PWM signal to the power chip for fine control. The power chip has pins for receiving the supply voltage, for sending a modulated signal to the controller chip; and for receiving the PWM signal from the controller chip. Circuitry in the power chip responds to the supply voltage to generate a first signal carrying analog information representing the magnitude of the power supply voltage, responds to the temperature of the power chip to generate a second signal carrying binary information corresponding to a thermal condition within the power chip, and responds to the first and second signals to generate a modulated signal which has a first characteristic carrying the analog information and a second characteristic carrying the binary information. Circuitry in the controller chip responds to the modulated signal to adjust the PWM signal to cause its ON phase to be substantially independent of the magnitude of the supply voltage, and demodulates the modulated signal to produce a warning signal and to send the warning signal to the microprocessor.

8 Claims, 7 Drawing Sheets

METHOD AND APPARATUS FOR PROVIDING THERMAL FEEDBACK BETWEEN AN ANALOG POWER CHIP AND A DIGITAL CONTROLLER CHIP IN A DISK CONTROLLER SYSTEM

FIELD OF THE PRESENT INVENTION

The present invention relates generally to a rotating magnetic storage disk drive ("disk drive") and more particularly to an improved method and apparatus for providing thermal feedback between an analog power chip and a digital controller chip used to control the spindle motor in such a disk drive.

DESCRIPTION OF THE RELATED ART

A contemporary disk drive most generally includes a head disk assembly ("HDA") and an integrated PC board which contains a disk drive controller system. The HDA includes a magnetic disk ("disk"), a spindle motor for rapidly rotating the disk, and a head stack assembly ("HSA") having a transducer head ("head") that is controllably positioned for reading and writing information from or to the rotating disk.

The disk drive must consistently read or write data when the head is at a particular position over the rotating disk relative to a previously detected servo position. Timing and consistent disk speed are therefore critical. A conventional disk drive controller system uses feedback to drive the spindle motor at a precise speed. The conventional speed is presently in the range of 5200 RPM, but higher speeds are becoming more common.

The disk drive controller system typically includes both analog and digital circuits that are directly or indirectly operated by a microprocessor. The conventional analog circuitry provides a spindle driver for driving the spindle motor and an actuator driver for driving the HSA and its associated head. The digital circuitry provides a host interface that links the disk drive with a host computer system, the channel electronics that read and write data on the disk through the transducer head, a buffer memory and buffer controller to accommodate the different data transfer speeds between the disk drive and the host computer, a first servo controller for controlling the radial position of the HSA and head via the actuator driver, and a second servo controller for controlling the speed of the spindle motor via the spindle driver.

The analog and digital circuitry discussed above is typically contained in custom made, application specific integrated circuits (ASICs). The analog circuitry is usually contained in an analog ASIC (or "analog power chip") and the digital circuitry is usually contained in a digital ASIC (or "digital controller chip"). There may, of course, be more than one analog and one digital chip in a given disk drive, but the industry trend is to place more and more functions in one chip to reduce the number of chips and overall cost of the disk drive.

Pulse width modulation (PWM) is a known method for controlling the speed of the disk via the spindle driver. The PWM control circuitry is inherently digital, but such circuitry is conventionally implemented in the analog ASIC to maintain close proximity to the analog circuits of the spindle driver.

The analog ASIC inherently requires a larger geometry die than the digital ASIC because of the greater power demands. The relative size between the analog and digital ASIC can be as much as ten to one in terms of area. It is much more expensive, therefore, to implement a digital function in the analog ASIC rather than the digital ASIC.

In addition, the analog circuitry can rapidly get very hot. A conventional disk drive controller system, therefore, detects the temperature within the analog ASIC and provides temperature information to the microprocessor so that it can prevent the analog ASIC from being damaged. The microprocessor can, for example, reduce drive parameters at a first "thermal warning" temperature. For protection against permanent damage, the analog ASIC terminates operation or "shuts down" altogether at a second higher "thermal shutdown" temperature. The thermal warning and shutdown functions can reduce cost by permitting the analog ASIC to run closer to its thermal limits without having to physically provide extra thermal margin such as heat sinks, expensive packaging, or larger drive transistors which increase silicon area.

The prior art disk drive controller systems known to these inventors have detrimentally placed the digital, PWM chopping circuitry in the analog ASIC, and, moreover, have placed a serial communication port in the analog ASIC so that the microprocessor may digitally receive thermal information from the analog ASIC and then digitally control the PWM chopping circuitry, as needed, based on such information. This approach detrimentally increases the overall cost of the disk drive by inefficiently placing digital circuitry in the analog ASIC, and, moreover, by requiring extra, costly pins for the serial port.

The market continually demands better disk drives at reduced cost. Accordingly, there is a need for a disk drive having a disk drive controller system which reduces silicon cost by moving as much digital circuitry as possible from the analog ASIC to a relatively inexpensive digital ASIC and which reduces pin cost by providing thermal communication between the analog and digital ASICs without using a costly, serial communication port.

SUMMARY OF THE INVENTION

The invention can be regarded as a disk drive controller system adapted to transfer thermal information while controlling a motor in a rotating disk drive. The controller system comprises an analog power chip, a digital controller chip, and a microprocessor. The analog power chip has means for providing power to a motor, means for producing a primary signal, means for generating a thermal signal corresponding to a thermal condition within the analog power chip, and means modulating the primary signal to output a modulated signal which carries primary information regarding the primary signal and thermal information regarding the thermal signal. The digital controller chip has an input for receiving the modulated signal, means for demodulating the modulated signal to recover the thermal signal, and means for outputting the thermal signal. The microprocessor receives the thermal signal from the digital controller chip and takes appropriate action.

Preferably, the motor is a spindle motor or a voice coil motor and the primary signal is a VCO producing a frequency which varies in response to a voltage supply. Preferably, the means for providing power to the motor operates in response to a PWM signal with a duty cycle that varies in response to the modulated primary signal. Preferably, the thermal signal generating means provide a first thermal signal representing a thermal warning condition and a second thermal signal representing a thermal shutdown condition. Preferably, the means for modulating the primary signal modulates the VCO frequency signal during the OFF phase of the PWM signal in response to the thermal warning condition and during the ON phase of the PWM signal during the thermal shutdown condition.

In another aspect the invention may be regarded as a method of transmitting thermal information between an analog power chip and a digital controller chip in a disk drive controller system that is adapted to control a motor in a rotating magnetic storage disk drive. The method comprises the steps of generating a primary signal in the analog power chip, detecting a thermal signal in the analog power chip that corresponds to a thermal condition within the analog chip, modulating the primary signal in response to the thermal signal, transmitting the modulated signal to the digital controller chip, and demodulating the modulated signal fmod in the digital controller chip to recover the thermal signal.

In another aspect the invention may be regarded as an analog power chip adapted to drive a motor in a rotating magnetic storage disk drive having means for producing a primary signal, means for generating a thermal signal corresponding to a thermal condition within the analog power chip, means for modulating the primary signal in response to the thermal signal to output a modulated signal carrying primary information and thermal information.

In yet another aspect the invention may be regarded as a digital controller chip adapted to interface with a microprocessor and with an analog power chip which produces modulated primary signal that carries primary information and thermal information. The digital controller has an input for receiving the modulated signal, means for decoding the modulated signal to recover the thermal information and means for transmitting the thermal information to the microprocessor.

An advantage of the claimed invention is that pin count can be reduced by providing multiple functions on a single pin, thereby reducing the cost of the controller system. Another advantage is that the invention eliminates the need for more complex circuitry in the analog power chip, thereby reducing the required silicon area which further reduces cost. In particular, the invention allows thermal information to be communicated over an existing circuit path.

Further features and advantages of the present invention will be appreciated by a review of the following detailed description of the preferred embodiment taken in conjunction with the following drawings.

DETAILED DESCRIPTION OF THE PREFERRED EMBODIMENT

Figure 1:
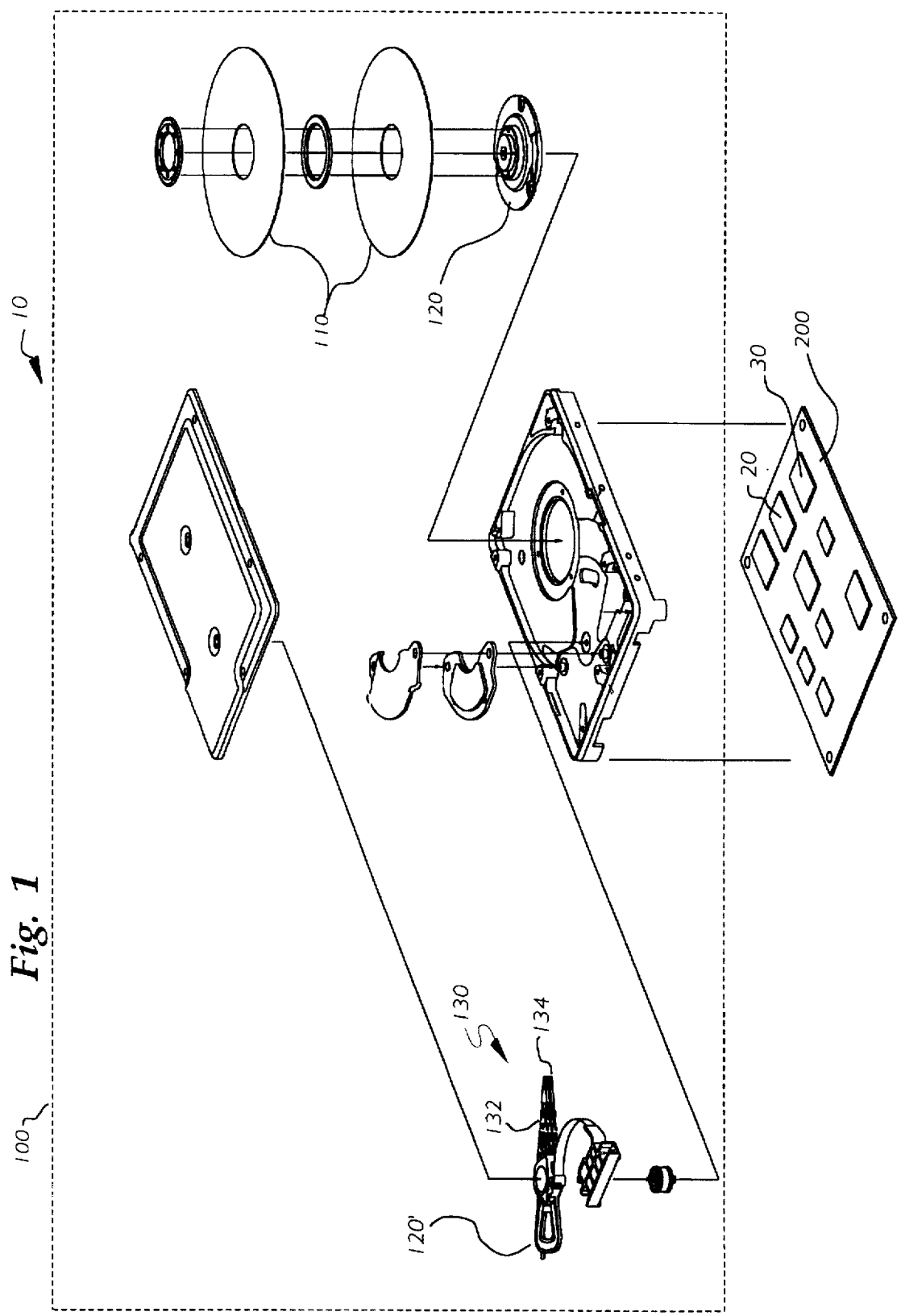
FIG. 1 is an exploded perspective view of a rotating magnetic storage disk drive 10, including a head disk assembly 100 (having a magnetic disk 110, a spindle motor 120, and a head stack assembly 130) and a disk drive controller system 200 according to a preferred embodiment of the present invention.

FIG. 1 shows the principal components of a disk drive 10 constructed in accordance with a preferred embodiment of the present invention.

Referring to FIG. 1, the preferred disk drive 10 is an integrated drive electronics (IDE) drive comprising a head disk assembly (HDA) 100 and an integral PC board which carries a disk drive controller system 200.

The HDA 100, as shown in FIG. 1, comprises a magnetic disk 110 (two shown), a spindle motor 120 for rapidly rotating the disk 110, and a head stack assembly 130 having a head suspension support arm 132 and a transducer head 134 that is biased against the disk 110. The storage capacity of the HDA 100 may be increased, as shown, by including several disks 110 and a head stack assembly 130 with a vertical "stack" of head suspension support arms 132 and heads 134 for each side of each disk 110. The HDA 100 also includes a voice coil motor 120', which like spindle motor 120 is controlled by the disk drive controller system 200.

Figure 2:
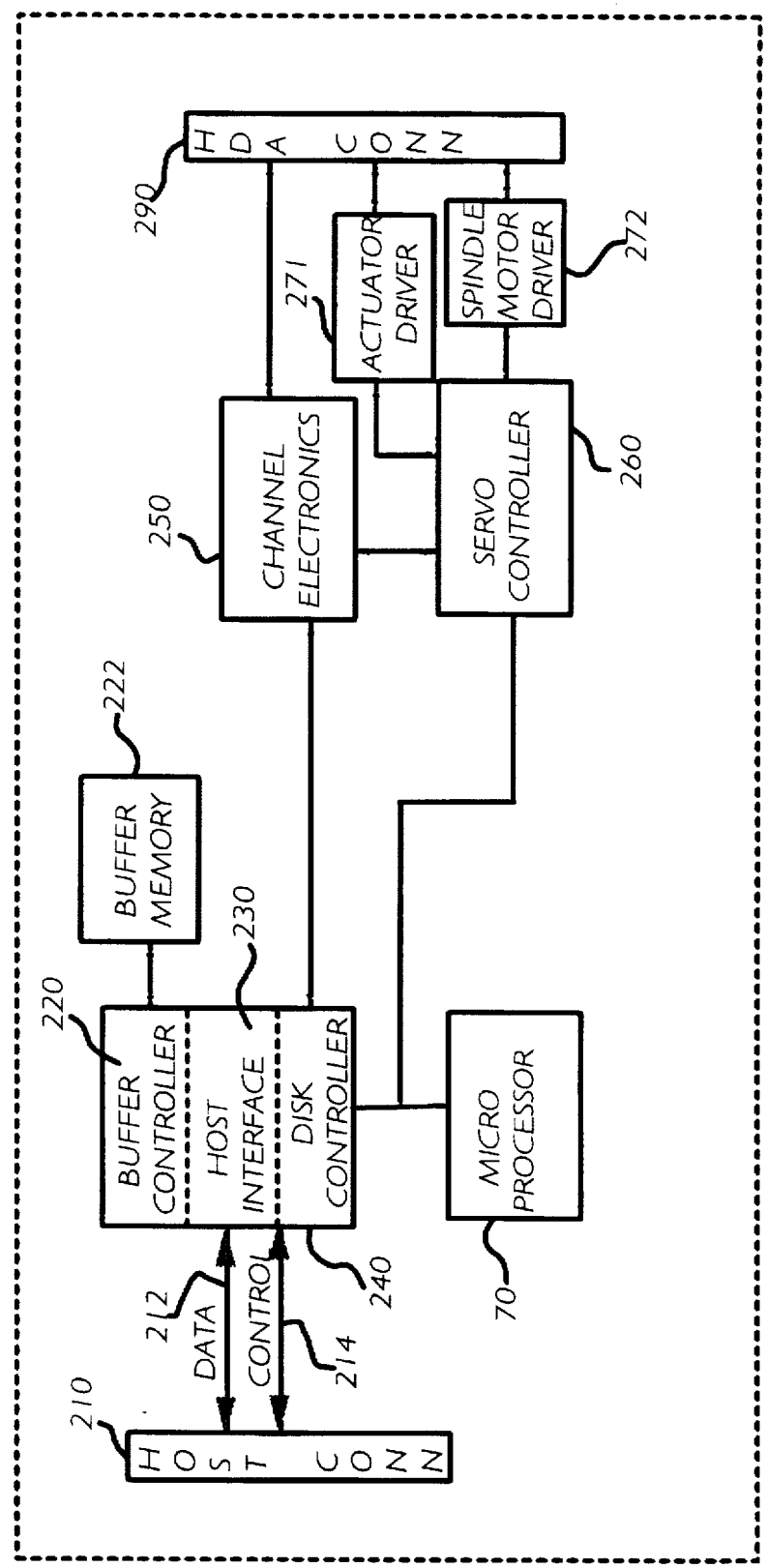
FIG. 2 is a simplified block diagram of the disk drive functions implemented in the disk drive controller system 200 of FIG. 1.

FIG. 2 illustrates the typical disk drive functions which are implemented on the disk drive controller system 200 of FIG. 1. FIG. 2 is provided for broad, functional context only, it being possible to combine or interface the circuit blocks shown in a variety of different ways.

As shown in FIG. 2, however, the disk drive controller system 200 generally includes a host connector 210 which interfaces the disk drive controller system 200 with data and control lines 212, 214 of the host computer's expansion bus, and an HDA connector 290 which interfaces the disk drive controller system 200 with the HDA 100.

The disk drive controller system 200 of FIG. 2 further includes a variety of analog and digital circuitry that is directly or indirectly operated by a microprocessor 70. The analog circuitry includes a spindle driver 272 for driving the spindle motor and an actuator driver 271 for driving the HSA 130 and its associated head 132. The digital circuitry includes a host interface 230 that links the disk drive 10 with the host computer, a buffer controller 220 and buffer memory 222 to accommodate the different data transfer rates between the disk drive 10 and the host computer, a disk controller 240 which provides operational control in conjunction with the microprocessor 70, channel electronics 250 that read and write data on the disk 110 through the transducer head 134, and a servo controller 260 for controlling the radial position of the head via the actuator driver 271 and for controlling the speed of the spindle motor via the spindle driver 272.

The present invention is particularly adaptable to a disk drive controller system 200 which uses a pulse width modulation ("PWM") signal to maintain motor speed by varying the ON time, or duty cycle, of the PWM signal during successive cycles. PWM motor drive is desirable because the PWM chopping minimizes IR heating problems.

Returning to FIG. 1, the preferred disk drive controller system 200 is seen to include an analog ASIC 20 ("analog power chip") and a digital ASIC 30 ("digital controller chip"). The PWM signal has conventionally been generated in the analog power chip 20 which, as mentioned above, is relatively expensive in comparison with the smaller geometry, digital controller chip 30.

Figure 3:
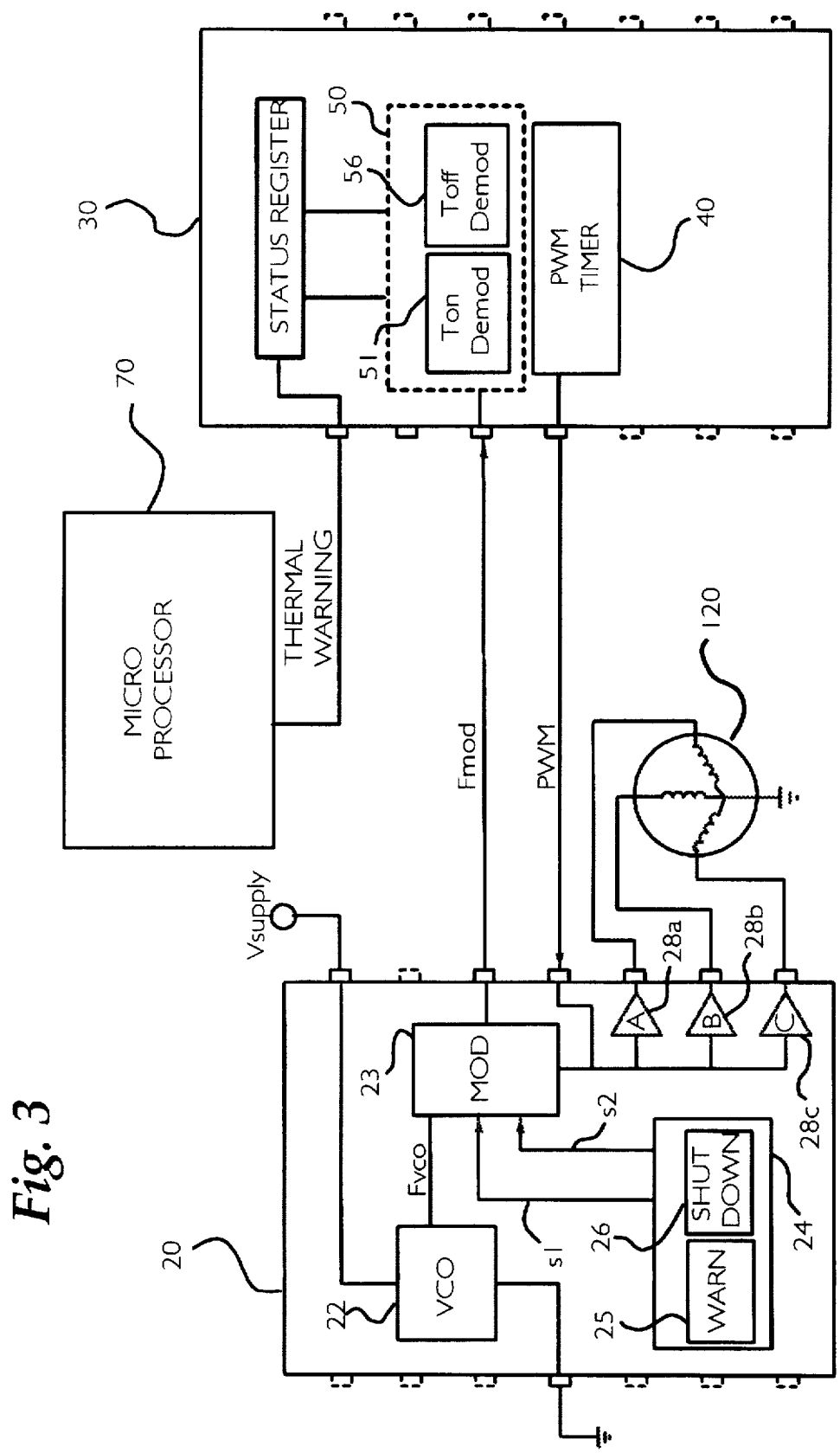
FIG. 3 is a block diagram of an analog power chip 20, a digital controller chip 30, and a microprocessor 70 which communicate thermal information and primary "feedforward" voltage supply information via a modulated signal $F_{mod}$, which communicates duty cycle spindle drive information via a PWM signal, and which form a part of the disk drive controller system 200 according to a preferred embodiment of the present invention.

As shown in FIG. 3, the present invention reduces the overall cost of the disk drive 10 by generating the PWM signal in the digital controller chip 30 rather than the analog power chip 20. The PWM signal generated in the digital controller chip 30 is, of course, communicated to the analog power chip 20 in order to drive the phases of the spindle motor 120 with switches 28a, 28b, 28c. The cost of one pin per chip, however, is significantly less than the alternative cost of generating the PWM signal in the analog power chip 20.

PWM motor drive generally involves voltage mode feedback because the inductive loads of the motor coils make it hard to use current mode feedback. Voltage mode feedback can be as troublesome too, however, because variations in the supply voltages $V_{supply}$ are now directly impressed onto the motor voltage $V_{motor}$:

$$V_{motor}=V_{supply}*t_{on}/T_{cycle} \quad (1)$$

It is possible to preemptively cancel the contribution of power supply ripple and other $V_{supply}$ variations, however, by using a special technique called "feedforward" wherein the ON phase of the PWM signal, grossly determined by the microprocessor 70 on the basis of a finite set of state conditions, is finely adjusted as a function of $V_{supply}$ as follows:

$$t_{on} = \frac{K}{V_{supply}} \quad (2)$$

wherein K is a scaling factor established by the chip manufacturer.

Substituting equation (2) into (1) shows that the affect of $V_{supply}$ is eliminated in that:

$$V_{motor}=K/T_{cycle} \quad (3)$$

Figure 5:
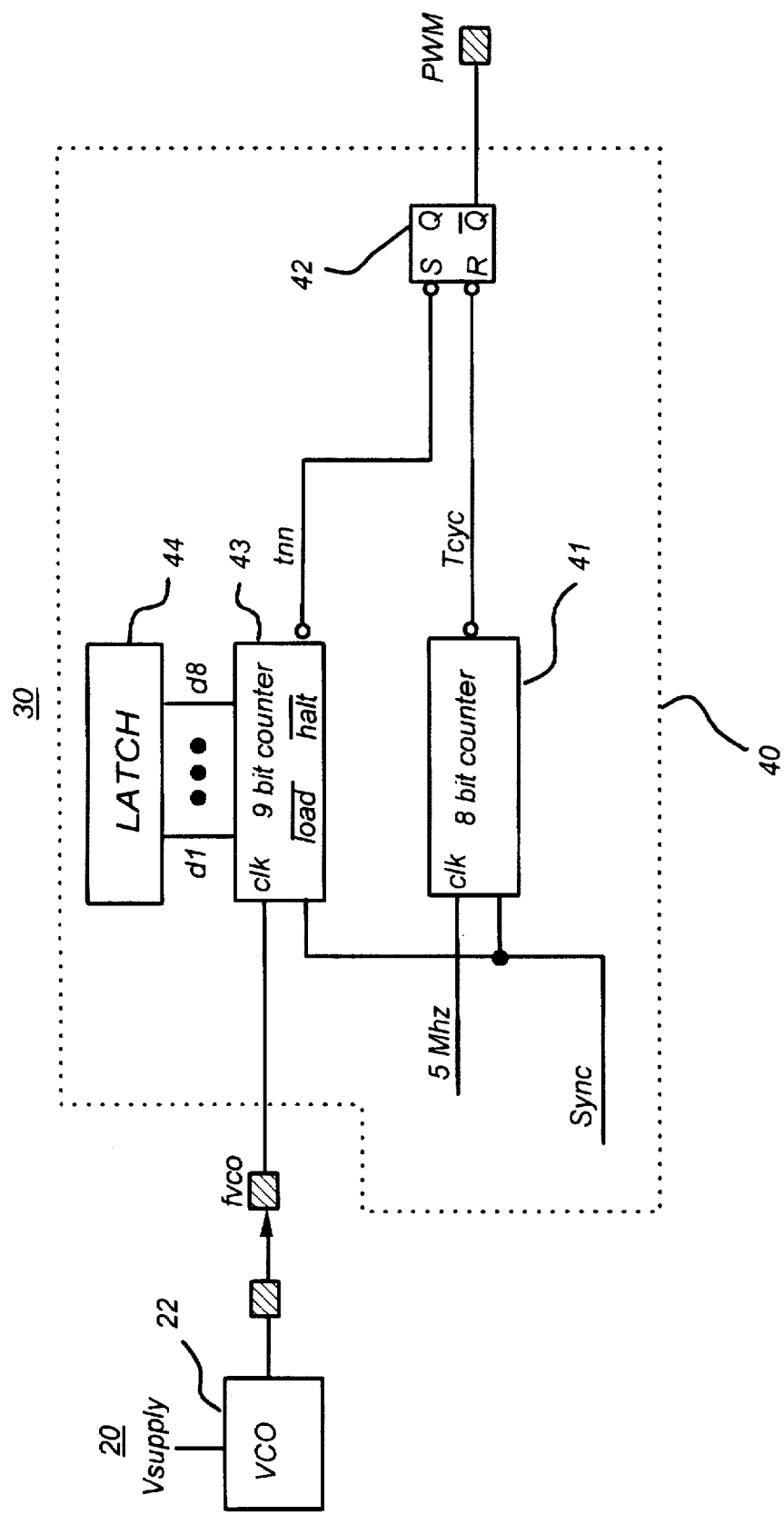
FIG. 5 is a simplified block diagram of the interface between the analog power chip 20 and the digital controller chip 30, showing the presently preferred apparatus for generating the PWM signal and for modifying the PWM signal based, in part, on the "feedforward" signal $F_{vco}$ having a frequency which beneficially varies in proportion to ripple in the voltage supply $V_{supply}$.

FIG. 5 illustrates the preferred circuitry for implementing the feedforward concept according to the present invention. As shown, the preferred analog power chip 20 contains a voltage controlled oscillator ("VCO") 22 that converts the voltage supply $V_{supply}$ to a high frequency "feedforward" signal $f_{vco}$ to form a primary signal containing primary information which the digital controller chip 30 uses, as generally described above, to pre-correct the duty cycle of the PWM signal for power supply variations. In particular, the ON phase of the PWM signal varies as a function of the frequency signal $f_{vco}$, and therefore as a function of the voltage supply $V_{supply}$ because an ON counter 43, which counts down and stops the ON phase, is clocked by the frequency signal $f_{vco}$.

In more detail, the preferred digital controller chip 30 comprises a PWM timer 40 generally including an RS latch 42; a cycle counter 41 which demarcates the cycles and starts the ON phase of the PWM signal via the RS latch 42; the just described ON counter 43 which stops the ON phase of each cycle via the RS latch 42 in accordance with an initial value, and further in accordance with the frequency signal $f_{vco}$; and a microprocessor controlled latch 44 for providing the initial value to the ON counter 43 in accordance with existing load conditions. The overall operation of the PWM timer 40, and its components, will be discussed more fully below.

Returning now to FIG. 3, it can be seen that the preferred analog power chip 20 contains a means 24 for generating thermal signals s1, s2. The preferred means 24 is one or more thermistors (not shown) that are strategically located next to temperature sensitive components within the analog power chip 20. As is well known, the resistance of a thermistor varies as a function of temperature. Accordingly, a thermistor can be used in a simple circuit to generate a voltage that varies with temperature, and that voltage can be compared in a conventional manner with a reference voltage corresponding to a predetermined temperature. As suggested by the first and second means 25, 26 for generating a thermal signal shown in FIG. 3, the preferred analog power chip 20 compares the thermistor regulated voltages with a first voltage that corresponds to a "thermal warning" temperature to generate a first thermal signal s1 and with a second higher voltage that corresponds to a second higher "thermal shutdown" temperature to generate a second thermal signal s2

The analog power chip 20, of course, must inform the microprocessor 70 if it experiences a thermal warning or thermal shutdown condition so that the microprocessor 70 can take appropriate action to protect the chip from being destroyed. Here, however, the goal has been to move the digital functions from the analog power chip 20 into the digital controller chip 30. It would be undesirably counter to this goal, therefore, to include a serial port and necessary digital support functions in the analog power chip 20. It would also be undesirable to include dedicated pins solely for the purposes of communicating thermal information out of the analog power chip 20.

In accordance with the present invention, however, the thermal information generated within the analog power chip 20 may be communicated to the microprocessor, via the digital controller chip 30, without requiring additional pins and while maintaining the digital portion of the PWM drive within the digital controller chip 30. The present invention accomplishes this innovation by providing, as shown in FIG. 3, a means 23 for modulating a primary signal which, in the preferred embodiment, comprises the frequency signal $f_{vco}$ that the analog power chip 20 must already provide to the digital controller chip 30 as "feedforward" correction of the PWM signal with respect to ripple in the voltage supply $V_{supply}$. It is possible, of course, to modulate other primary signals besides the frequency signal $f_{vco}$.

Figure 4:
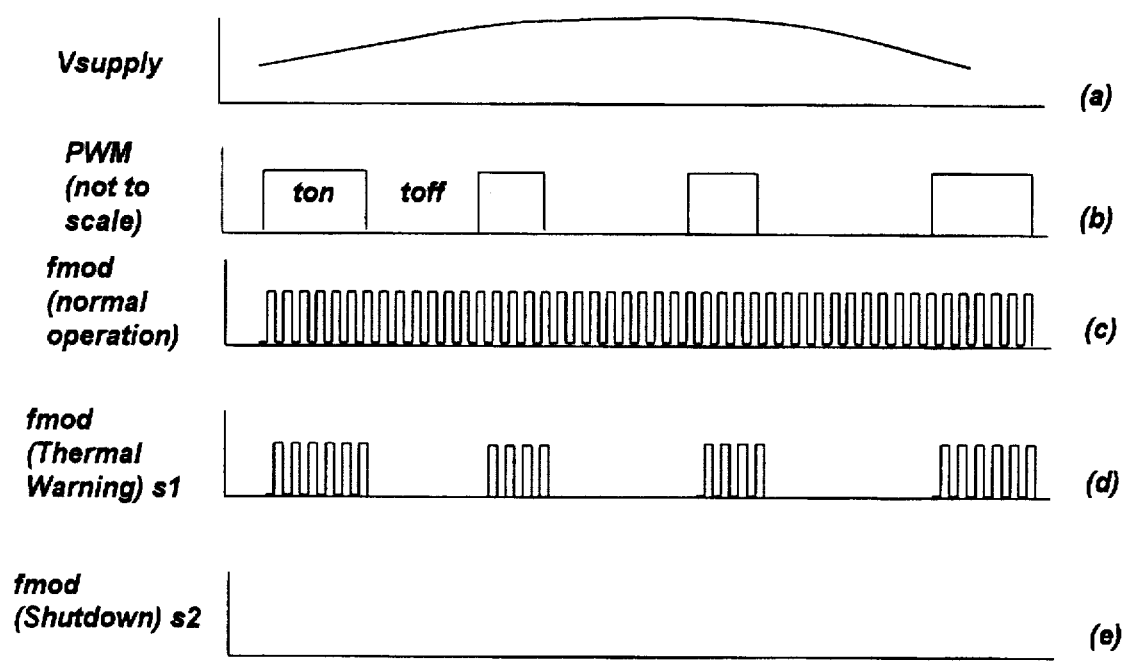
FIG. 4 is a timing diagram of the modulated signal $F_{mod}$ under normal operating conditions, during thermal warning, and during thermal shutdown, relative to the PWM signal.

As suggested by FIG. 4, the preferred modulating means 23 tracks the ON and OFF phases of the PWM signal in order to modulate the frequency signal $f_{vco}$ in accordance with the thermal warning signal s1 and the thermal shutdown signal s2. In particular, the preferred modulating means 23 selectively suppresses the frequency signal $f_{vco}$ during the ON and OFF phases of the PWM signal and outputs a modulated signal $f_{mod}$ corresponding to no thermal signal (normal operation), thermal warning signal s1, and thermal shutdown signal s2, as respectively shown in portions (c), (d), and (e) of FIG. 4.

It is possible, of course, to use other modulating methods and corresponding demodulation methods known in the art such as but not limited to, frequency modulation or phase modulation, to provide a means for communicating the thermal signals s1 and s2.

The preferred digital controller chip 30 receives the modulated signal $f_{mod}$ as shown in FIG. 3, and therefore includes a means 50 for demodulating the signal. The demodulating means 50 thereby recovers the thermal information from the modulated signal $f_{mod}$ and, via a digital interface, makes it available to the microprocessor 70 in order for appropriate action to take place. The preferred demodulating means 50 includes a $T_{off}$ demodulator 51 and a $T_{on}$ demodulator 56. The $T_{off}$ demodulator 51 detects the absence of the modulated signal $f_{mod}$ during the OFF phases of the PWM signal (condition (d) of FIG. 4) and the $T_{on}$ demodulator 56 detects the absence of the modulated signal $f_{mod}$ during the ON phases of the PWM signal (condition (e) of FIG. 4).

Figure 6:
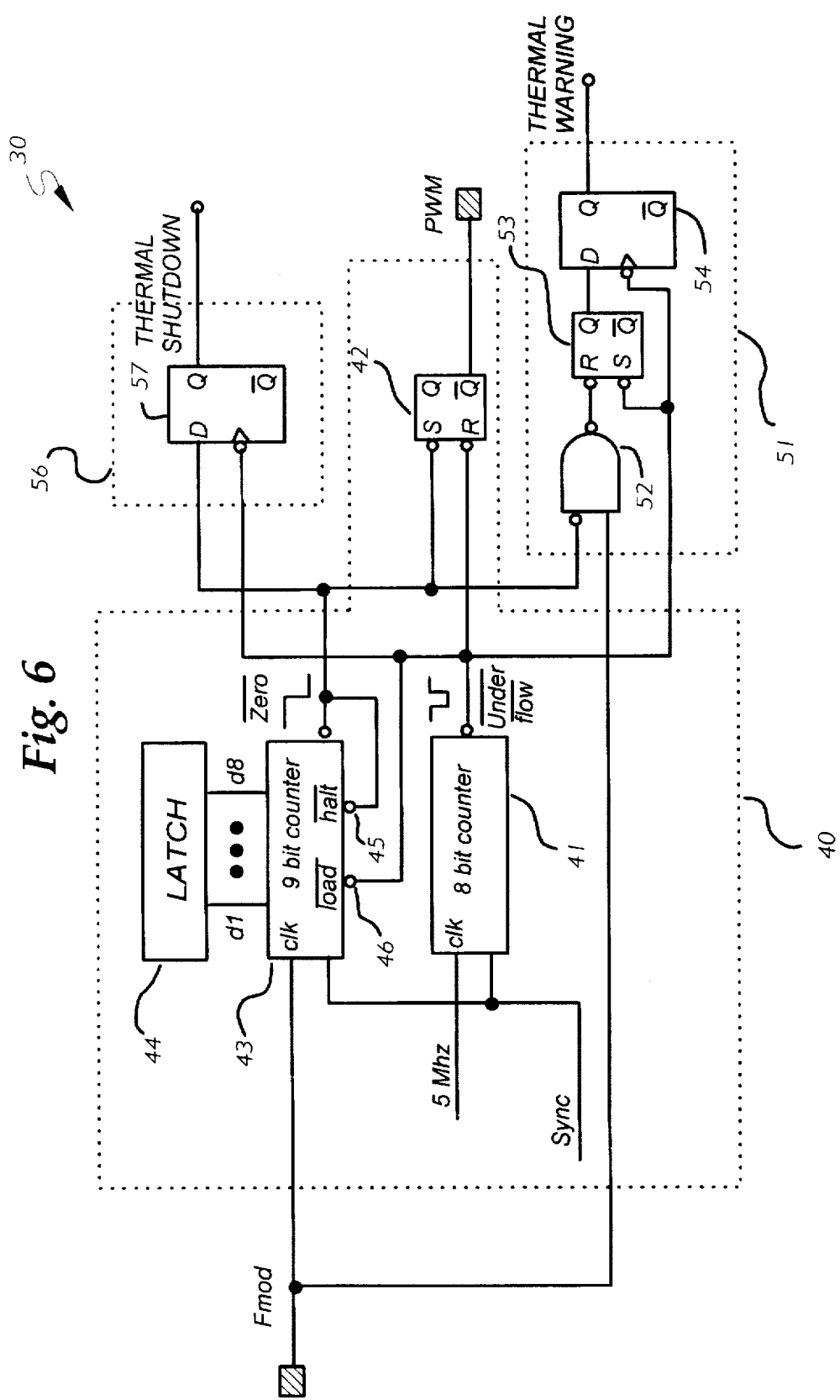
FIG. 6 is a block diagram of certain circuitry in the digital controller chip 30 showing, relative to FIG. 5, the addition of ON and OFF phase demodulators 51, 56, for detecting thermal shutdown or thermal warning information in the modulated signal $f_{mod}$ of FIG.3.

FIG. 6 is a block diagram of the presently preferred PWM timer 40, the $T_{off}$ demodulator 51, and the $t_{on}$ demodulator 56. The preferred PWM timer 40, as previously described with respect to the feedforward concept of FIG. 5, comprises an 8-bit cycle counter 41, an RS latch 42, a 9-bit ON counter 43, and a parallel latch 44 for initializing the ON counter. The maximum ON & OFF cycle time is governed by the 8-bit cycle counter 41 which counts down from 256 and thereby demarcates the cycles with a low going $\overline{\text{Underflow}}$ pulse.

Figure 7:
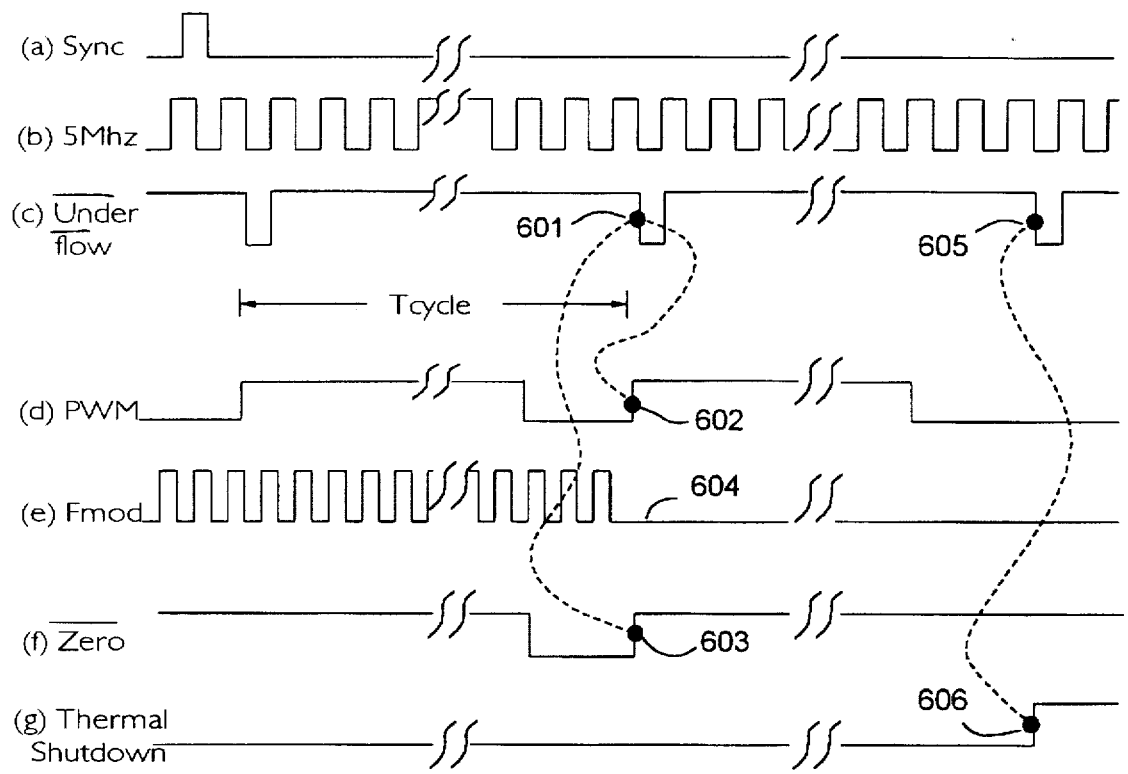
FIG. 7 is a timing diagram illustrating the operation of the circuitry of FIG. 6.

FIG. 7 is a timing diagram which helps illustrate the operation of the circuitry shown in FIG. 6. As shown, a sync pulse (a) is provided in order to reset the counters 41, 43 at the start of each commutation phase for the spindle motor 120. The cycle counter 41 is driven by a 5 MHz clock such that the $\overline{\text{Underflow}}$ pulse (c) is generated once every 51.2 uSec ($T_{cycle}$ of FIG. 7), i.e. at a frequency of 19.53 kHz. The Underflow pulse "resets" the RS latch 42 so that its $\overline{Q}$ output goes high to start the ON phase of the PWM signal (d). The $\overline{\text{Underflow}}$ pulse also drives the load input of the 9-bit ON counter 43, causing it to parallel load the initial value that the microprocessor 70 (not shown in FIG. 6) had previously placed in the latch 44 in accordance with existing conditions. The microprocessor latched value grossly determines $T_{on}$. The previously described parallel load operation also resets the $\overline{\text{zero}}$ signal at 603. The 9-bit ON counter 43, now loaded and enabled, is then clocked by the modulated signal $f_{mod}$ (e) to finely adjust $T_{on}$ in accordance with variations in the voltage supply $V_{supply}$. The ON counter 43 counts down from its initial value, to zero, at which point it asserts a $\overline{\text{zero}}$ signal. The zerosignal goes low to block further changes in the counter state via a $\overline{\text{halt}}$ terminal 45 and "sets" the SR latch 42 so that its $\overline{Q}$ goes low to stop the PWM signal's ON phase and start an OFF phase. In the absence of a thermal warning or thermal shutdown condition, the PWM signal's ON & OFF phases will continue, the 8-bit cycle counter 41 repeatedly issuing $\overline{\text{Underflow}}$ pulses (c) to start successive ON phases, one every 51.2 uSecs, and the 9-bit ON counter repeatedly setting its $\overline{\text{zero}}$ terminal low (f) to stop the ON phases and start the OFF phases.

The preferred $T_{off}$ and $T_{on}$ demodulators 51, 56 beneficially detect the presence of a thermal warning or thermal shutdown condition in the analog power chip 20 by monitoring the modulated signal $f_{mod}$ relative to the ON & OFF phases. The $T_{off}$ and $T_{on}$ demodulators 51, 56 of FIG. 6 assume that the modulated signal $f_{mod}$ is suppressed during the OFF phases for a thermal warning condition and suppressed during the ON and OFF phases for a thermal shutdown condition.

The preferred $T_{off}$ demodulator 51, for example, comprises a NAND gate 52 having inverting and non-inverting inputs, a thermal warning test latch 53, and a D flip flop 54. The D flip flop 54 is clocked by the $\overline{\text{Underflow}}$ pulses. The thermal warning test latch 53 is ordinarily set (Q="1") at the start of each cycle when the $\overline{\text{Underflow}}$ pulse is asserted. At the conclusion of the ON phase when the zero terminal goes low at the inverting input of NAND gate 52, thereby starting the OFF phase, and then a frequency signal $f_{mod}$ pulse arrives at the other input of the NAND gate 52, latch 53 is reset. If, however, a thermal warning condition existed in the analog power chip 20 such that the $f_{mod}$ pulses are suppressed during the OFF phase, after the zero terminal has dropped low, than the thermal warning test latch 53 remains set (Q="1"), and the $\overline{\text{Underflow}}$ pulse will clock the output (Q="1") of the test latch 53 into the D flip flop 54 to communicate the thermal warning condition to the microprocessor 70.

The preferred $T_{on}$ demodulator 56 is implemented with a single D flip flop 57 that is clocked by the leading edge of the $\overline{\text{Underflow}}$ pulse. If there is no thermal shutdown, the D flip flop 57 is not set because the ON counter 43 was clocked by the modulated signal $f_{mod}$ and counted down to zero to assert and then hold the $\overline{\text{zero}}$ terminal. If, on the other hand, there was a thermal shutdown and the modulated signal $f_{mod}$ pulses had been suppressed by the analog power chip 20 as indicated in FIG. 7 at 604, then the $\overline{\text{zero}}$ terminal will remain high and the next $\overline{\text{Underflow}}$ pulse at 605 will set the D flip flop 57 at 606 to communicate the thermal shutdown to the microprocessor 70.

The above description of the invention has focused on communicating thermal information from the analog power chip 20 by modulating a VCO generated frequency signal $f_{vco}$. It should be understood, however, that the invention may be implemented with any signal f which is generated by a signal generating means within the analog power chip 20 and provided externally as a "thermally" modulated signal $f_{mod}$. Accordingly, the above description of the preferred embodiment should only be viewed as illustrative of the invention as set forth in the following claims.

We claim:

1. A disk drive having a plurality of integrated circuit chips and a spindle motor with multiple windings, the chips including a microprocessor, a digital controller chip, and an analog power chip, the analog power chip operating under gross and fine control to connect, during an ON phase, and to disconnect, during an OFF phase, a power supply voltage to each of the windings on a pulse width modulated (PWM) basis, the magnitude of power supply voltage being subject to variation, and the analog power chip being subject to an increase in its temperature, the disk drive comprising:

gross-control means in the microprocessor for sending a digital control signal to the digital controller chip to establish the gross control;

fine-control means in the digital controller chip for sending a PWM signal to the analog power chip;

the analog power chip having:

pin means for receiving the power supply voltage;

circuit means responsive to the power supply voltage for generating a first signal carrying analog information representing the magnitude of the power supply voltage; circuit means responsive to the temperature of the analog power chip for generating a second signal carrying binary information corresponding to a thermal condition within the analog power chip;

modulating means responsive to the first and second signals for generating a modulated signal which has a first characteristic carrying the analog information and a second characteristic carrying the binary information;

a pin for sending the modulated signal to the digital controller chip; and a pin for receiving the PWM signal from the digital control chip;

the fine-control means including means responsive to the modulated signal for adjusting the PWM signal to cause the PWM signal to have an ON phase that is substantially independent of the magnitude of the power supply voltage; and the digital controller chip also having means for demodulating the modulated signal to produce a warning signal and to send the warning signal to the microprocessor.

2. The disk drive of claim 1 wherein the means for producing the first signal includes a VCO.

3. The disk drive of claim 1 wherein the VCO has a frequency which represents the magnitude of the power supply voltage.

4. The disk drive of claim 3 wherein the first characteristic of the modulated signal is its frequency during predetermined periods of operation.

5. The disk drive of claim 3 wherein the second characteristic of the modulated signal is its amplitude.

6. The disk drive of claim 4 wherein the digital controller chip comprises a chopping circuit that produces the PWM signal with a duty cycle that varies in part as function of the frequency of the modulated signal.

7. The disk drive of claim 1 wherein the circuit means for generating the second signal comprises:

means for generating a signal s1 that represents a thermal warning condition; and means for generating a signal s2 that represents a thermal shutdown condition.

8. The disk drive of claim 7 wherein the first characteristic of the modulated signal is its frequency during predetermined periods of operation; the second characteristic of the modulated signal is its amplitude, and wherein the amplitude is suppressed during the OFF phases of the PWM signal in response to the s1 signal to indicate the thermal warning condition, and is suppressed during the ON phases of the PWM signal in response to the s2 signal to indicate the thermal shutdown condition.

* * * * *